United States Patent
Korth

[19]

[11] Patent Number: 5,914,751
[45] Date of Patent: *Jun. 22, 1999

[54] METHOD AND APPARATUS FOR PERCEPTION-OPTIMIZED TRANSMISSION OF VIDEO AND AUDIO SIGNALS

[75] Inventor: Hans-Erdmann Korth, Stuttgart, Germany

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/702,364
[22] Filed: Aug. 23, 1996
[51] Int. Cl.$^6$ .............................. H04N 7/12; H04N 11/02; H04N 11/04
[52] U.S. Cl. ............................................. 348/409; 348/420
[58] Field of Search ..................................... 348/384, 390, 348/405, 459, 419, 420–1; H04N 7/12, 11/02, 11/04

[56] References Cited

U.S. PATENT DOCUMENTS

| | | |
|---|---|---|
| 5,111,292 | 5/1992 | Kuriacose et al. ...................... 348/384 |
| 5,122,875 | 6/1992 | Raychaudhuri et al. ................ 348/390 |
| 5,144,424 | 9/1992 | Savatier ................................... 348/405 |
| 5,148,272 | 9/1992 | Acampora et al. ...................... 348/390 |
| 5,168,356 | 12/1992 | Acampora et al. ..................... 348/384 |
| 5,689,300 | 11/1997 | Shibata et al. ............................ 348/15 |

*Primary Examiner*—Bryan Tung
*Assistant Examiner*—Nhon T. Diep
*Attorney, Agent, or Firm*—Ronald L. Drumheller

[57] ABSTRACT

The present invention describes a process and a device for perception-optimized transmission of video and audio data. The picture coming from a video source is compared with a reference picture. The picture differences are investigated for perception-relevant picture data and transmitted to a receiver in accordance with their priority. If the amount of data required for refreshing exceeds the capacity of the data channel, the less relevant data (lower priorities) is held back. A particular embodiment of the present invention comprises storing the individual pictures as structured difference pictures. The present invention can be applied analogously to the transmission of audio data.

9 Claims, 3 Drawing Sheets

METHOD AND APPARATUS FOR PERCEPTION-OPTIMIZED TRANSMISSION OF VIDEO AND AUDIO SIGNALS

BACKGROUND OF THE INVENTION

1. Field of the Invention

The present invention relates to a device and method for perception-optimized transmission of audio and video signals.

2. Related Art

In multimedia applications playing-back moving pictures on the computer monitor is becoming ever more important.

The main problem in representing video pictures on today's PC's lies in the bus bandwidth in relation to the large amount of data required for picture formation. Thus a single television picture (640×400 pixels) in 24 bit color requires more than 1 megabyte of memory. According to the European television standard, about 23 MB per second are required. From this it is clear that the buses and the hard disks of today's PC's are not suited to this quantity of data. Transfers of video data through ISDN, with a transfer rate of 64 kbits per second set narrow limits. Picture resolution and picture speeds must be reduced. The same applies to the transfer of video data via telephone lines.

In respect of the high data transfer rates, three basic methods have been established to bring video pictures to a PC platform.

The first method solves the problem by displaying a video picture directly on a screen window without transferring it through the PC bus and memory.

The second method is based on extending the bandwidth of the bus by using supercomputers.

The third method solves the problem of high data transfer rates by data compression. Data compression seeks to reduce the data transfer rates sufficiently to enable the existing bandwidths of the buses to be fully utilized, without significant loss in quality. All data compression methods for picture representation are based on the knowledge that the brain can process less picture information than the human eye can accept. As a result, data compression can be carried out to such an extent that the reduction in picture quality cannot be detected by the brain. In this case, less relevant information is simply neglected in data transfer.

There are two types of data compression, namely data compression involving no loss and that where a loss is involved.

Video and audio signals contain redundant information which can be combined and compressed without loss of picture quality. The data compression factor lies between 1.5:1 and 3:1. In contrast to this, in data compression involving loss, signal information which is not important for recognition is simply not transferred. The advantage in this case is a higher compression factor. The disadvantage resides in determining what is important or less important for recognition. What is important or less important is decided by the coder/decoder. The coder can carry out data compression either within individual pictures (intraframe compression) or between several pictures (interframe compression) or by a combination of both methods.

In data compression within individual pictures, a number of techniques exist to determine the data compression factor and the quality of the compression by the way in which they are combined or arranged. Thus the compression techniques include, inter alia, filtering, color-separation conversion, scaling, transforming and run-length coding.

In filtering, the picture is not directly compressed but instead is prepared for data compression. This is generally effected by simply eliminating the high frequencies.

Color-separation conversion, is based on the knowledge that the human eye finds it more difficult to distinguish colors than shades of brightness. Consequently, the picture is subdivided into one luminance component and two chrominance components. The chrominance components are then evaluated at a lower resolution.

In scaling, the three parameters, resolution, color depth and frame rate are changed.

Transformation is based on the co-called DCTS; cosine transformation. In this method, the picture information is sub-divided into 8×8 pixel blocks and high and low frequencies.

In run-length encoding, the data are coded without loss of information. Identical bits are replaced by numbers (e.g. 1111222 by 4132).

Data compression through frame sequences is based on the fact that, with running video pictures, the greatest data redundancy is not in individual pictures but between several pictures in a sequence. Many pixels often change only slightly from frame to frame and generally not at all, so that only the difference between the individual frames needs to be coded and not the individual pictures themselves.

MPEG has become internationally widespread as the standard for data compression and decompression of audio and video pictures, particularly for pictures stored on CD. MPEG is based on a combination of the above-described compression processes (intraframe compression and interframe compression). With MPEG, data rates of 1,856,000 bits per second can be processed.

In order to carry out the cosine transformation, MPEG requires a high level of computing power. A further disadvantage of the MPEG process resides in the fact that the maximal achievable compression is limited because of the possible local and time compression at a predetermined resolution and frame rate. In addition, MPEG requires the picture to be completely reconstructed at regular intervals.

SUMMARY OF THE INVENTION

It is consequently an object of the present invention to propose a device and method in which the physiological aspects of perception by the human brain in perceiving picture and sound information is taken into account to an even greater extent in data transfer, so that the amount of data transferred can be further decreased and the computer capacity reduced without the substantial deterioration in the picture and sound quality.

This object is achieved by the features described in the independent claims. Further advantageous embodiments of the process in accordance with the invention are shown in the sub-claims.

The advantage of the present invention lies in the perception-optimized prioritizing of the picture data to be transmitted. The picture transfer is carried out in such a way that the perception of the picture sequence, in particular the largely independent coverage of brightness, color, contours and movement are in the foreground. By making use of masking effects, selectively high video quality can be attained, even at lower data rates.

In the proposed method, the picture resolution is load-dependent. Within the framework of the available bandwidth and the picture information to be transmitted, the significant bits of large structures are prioritized, the lower value bits of fine structures are transmitted in the background. At higher load, the altered picture elements appear somewhat coarsened. Static pictures are represented unaltered. Reduction in data results from the background handling of fine structures. In contrast to filter techniques, data is only lost if the transfer capacity is exhausted and masking results through data of higher value.

The present invention is based on perception-optimized data transfer. In this, following physiological aspects of the perception of picture information by the human brain is taken into account to a greater extent than in conventional compression methods. Optical perception represents the result of the neuro-physiological processing chain between the retina and consciousness. A number of mechanisms ensure that, despite severely limited processing capacity, picture perception takes place within a few 10s of milliseconds. While there is a clear relationship between picture and picture information, perception covers only the currently relevant parts of the picture information. The relevance of perception decreases with increasing information density (space/time). The transfer of structures below the perception horizon can therefore be delayed without significant reduction in the quality of reproduction of the picture. It should therefore be the object of a picture transmission to keep the deviation from the perception of the original as small as possible. These neuro-physiological processes in the perception of pictures form the starting point for the present invention.

The present invention can be described briefly as follows:

A reference picture is formed. This reference picture is compared with each new successive picture, i.e. difference pictures are produced. The difference pictures contain the picture differences between each successive picture and the reference picture. The picture elements, which represent the picture differences, contain a priority. These picture elements are transmitted to the receiver according to the level of the priority. Picture elements are represented by blocks with a fixed number of data bits. Edge length and number of bits of the particular block determine the priority. A large block with many bits will rank as important in the priority sequence and will be transmitted to refresh the main picture. Small blocks with few bits have a low priority and will be considered at lower priority. If, for example, only 100 priorities are considered per frame, priorities 101, 102 will be deferred and will be considered at a later frame provided that more important priorities do not have to be taken into account. The prioritizing of the picture data to be transmitted permits data reduction in a relatively simple manner in comparison with the state of the art. With the available compression methods (JPEG, MPEG) all picture difference data are transferred for each frame.

The present methods for carrying out the present invention comprise the following steps:

1. The current picture is stored by both sender and receiver.
2. The new picture will be stored as a structured difference picture. This will be done by recording the difference value from each pixel to its anchor pixel in the foregoing structure. The anchor address will be produced by zeroing bits of the pixel address. In this way the number of bits per pixel to be transmitted will be reduced in the middle.
3. The creation of a structured difference picture permits a rapid approximation to the actual picture: subordinated structures can be represented with the pixel value of the already available anchor pixel. The alteration of a pixel also effects a change in all pixels of the relevant block.
4. The blockwise structure of the different picture effects resetting to the value of the preceding anchor pixel in the actual picture. The setting of blocks is also useful if the cost of changing is reduced, compared with access to an individual pixel. This depends upon the likelihood of the appearance of structures which can be estimated from the change in the three main pixels. If the picture value of the three main pixels changes (with large structures correspondingly more pixels must be tested) compared with the actual in the same sense and the same magnitude, then the block is to be renewed.
5. By deleting blocks, evaluated regions can be removed rapidly from the picture. Pixels, where the amount of difference compared with the current picture has decreased or the values of which are already at zero, count as evaluated. The same applies to blocks in which all the sub-blocks have been evaluated. It is thus possible, in addition to complete deletion, to effect selective deletion, only the low value bits are zeroed or only pixels below a certain structure level.
6. Prioritizing for creating or matching the current picture: the divergence between the actual and the current picture is evaluated in accordance with structural level and the number of significant bits in order to record preferentially structures which are large and of high contrast. Prioritizing in accordance with "structure and bits" can be refined in that the low value bits are ranked lower, since these are determined to a greater extent by picture noise.
7. The values found in this way (priorities) are held, with their addresses, in a priority list. If the list is full, for each new candidate for inclusion that with the lowest priority must be discarded. The lowest value in any case within a priority list makes it possible to eliminate a large number of values in small structures from further search at an early stage.
8. The candidates are coded in various ways: for this an identical list of the picture elements ordered by priority are sent by the sender and receiver. If a candidate is already in the list the value is matched. If the priority has altered, the picture element must be reordered. Picture elements which have neighbors in the list, are addressed as run-length codes in the lists and arranged with their value in the list. The optimal length of the RL code can be optimized according to the priority level and the density of values of higher priority.
9. For transmission, the RL codes of the new values of high priority are send first. Then follow the values with neighbors. Finally, the remaining bits from the list are called up. If the picture element has no further information, it will remain in the list for a number of frame cycles. In this way it can serve for the addressing of neighbors.
10. The data prepared in this way are transmitted. The data are decoded and used by the sender to update the picture storage.
11. The candidates received mark the blocks of the current picture which has to be transmitted to the screen. Only this part has to be re-written and this reduces the requirements for internal data transmission. Only with a change of scene and in the case of rapid movement must a larger part of the screen be re-written. In this case, it is possible to store unsuccessful candidates until the next picture cycle.
12. If the value of a unit of area (e.g. a square) is changed, then it is necessary to smooth the transfer to the neighboring regions to prevent the formation of artifacts. Consequently, a linear transition to fill the unit of area must be produced, so that a linear run results between neighboring corners. If a linear run between two corners is not possible because the neighboring field is sub-divided, the area element must continue to be sub-divided before smoothing until this is possible.

BRIEF DESCRIPTION OF THE DRAWINGS

The present invention will be illustrated and explained by means of an example of a preferred embodiment, where.

DESCRIPTION OF THE PREFERRED EMBODIMENTS

Figure 1A:
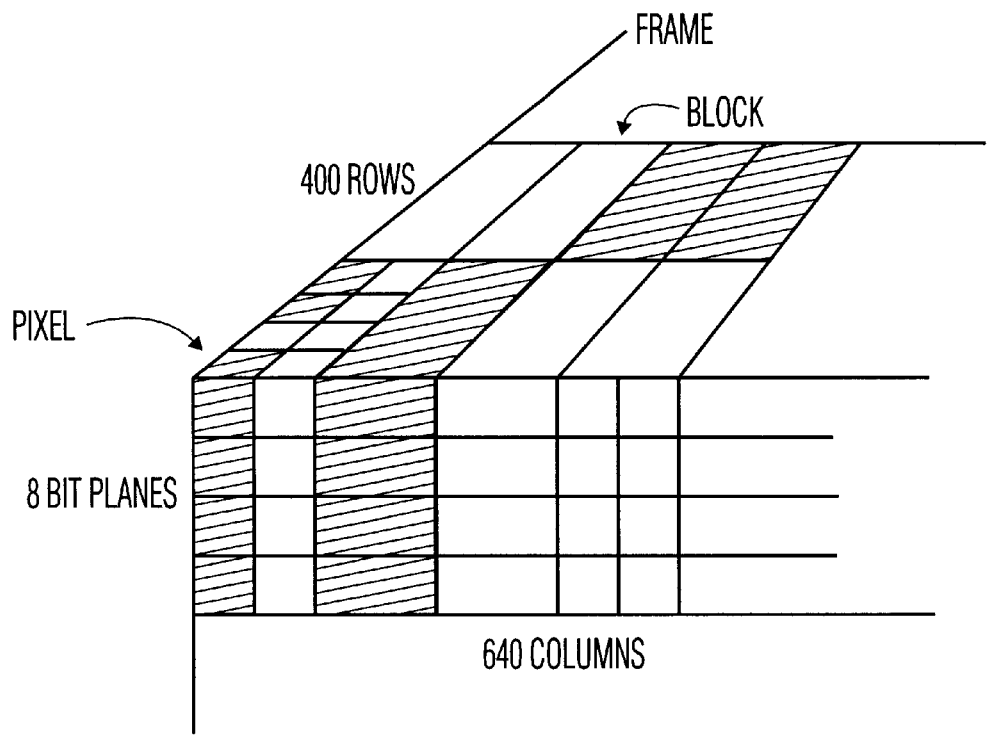
FIGS. 1A and 1B describe the picture storage structure for the present invention.

FIG. 1A shows a picture memory divided by rows and columns and bit levels. An example is shown of the summarizing of the picture elements to blocks (neighboring picture elements) and superblocks.

The block formation serves primarily to save addressing data in transmitting the individual picture elements. If several picture elements in a block are summarized, then the block only needs to be addressed once. The block contains the anchor pixel value as the picture value. The priority of the block is raised to a priority in respect of the lowest priority of the picture elements contained in the block. The same applies to the neighboring blocks, which are summarized to a larger block. The priority of the larger block is raised to a priority compared with the lowest priority of the blocks which it contains.

Figure 1B:
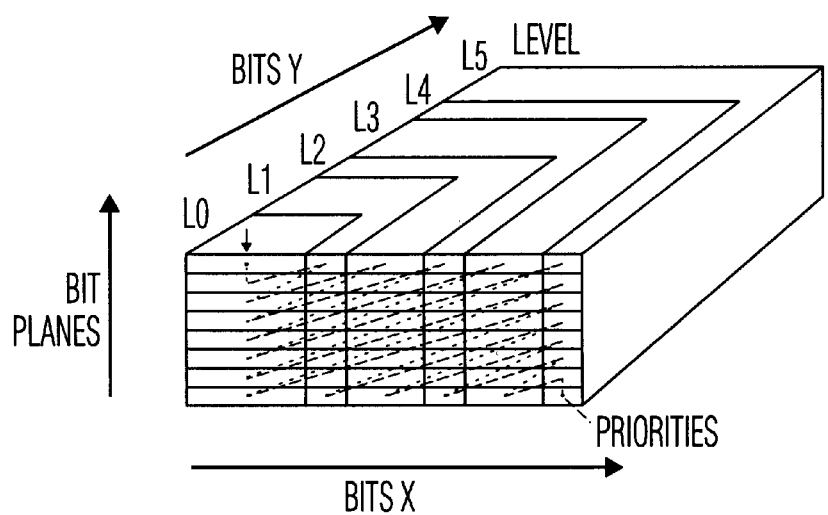

In contrast, FIG. 1B shows the representation of an address space. The address space is again divided into the bit levels and the number of bits required for addressing in the x and y directions. An example is shown for prioritizing, which shows a sequence of priorities by block size and significant bits.

Bit Levels and Structure Priority Lists

The priority for the individual picture elements can be defined as the sum of structure level and bit level. This means that high priority is given to particularly bright, highly contoured objects, while small, weakly contoured details are considered at low priorities. In cases of similar structure size, the brightness (contrast, color) determines the priority. Each pair of structures and bit plane levels has a priority value within the priority list. For small structures with many pixels, a sub-group is formed within the priority list. This allows simplification of picture processing through the skipping of non-relevant data. Data of low priority will be tested provided that there are no higher values available. The priority within a structure field depends on the distance between the structure and the center of the screen.

To transmit a string of characters, the candidate with the highest priority is selected. In this way, the actual structure and bit plane level will be defined. On the basis of this, a tree structure can be formed which contains candidates from neighboring memory cells (e.g. big blocks, sub-structures, neighbors). Candidates within the tree structure are transmitted with access information. This process is repeated until the priority list is exhausted.

Access Tree

A model statement in the form of a tree structure can be employed to represent the picture structure. The following statements can be made:

1. A maximum number of values can be accessed from a candidate with the highest priority.

2. A block with pixels can be a candidate if the neighboring anchor value has a non-zero value.

3. A neighboring block can likewise be a candidate if the pixels along the margins have a non-zero value.

A simple test bit is sufficient to determine whether the access to candidates can proceed or not. Candidates which are not contained in the statement model must be accessed separately. An optimized model can reduce the cost of access.

Figure 2:
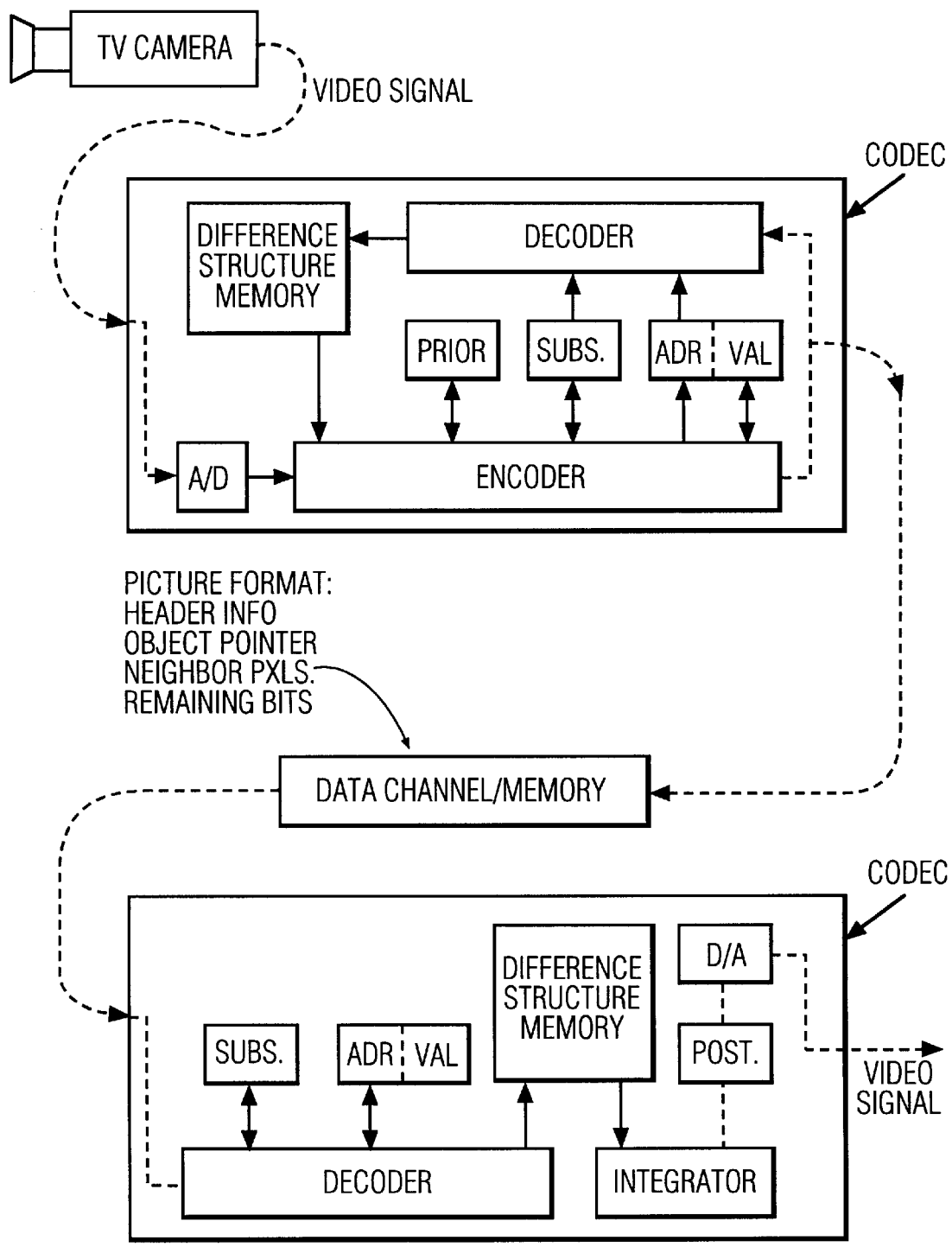
FIG. 2 describes the invention by means of a block-switching diagram.

FIG. 2 shows the present invention by means of a block diagram. The present invention can be divided into three part-processes, namely into a picture analysis process, a compression process and a decompression process.

Picture Analysis Process

The incoming picture data are digitized and compared with the picture data for a reference picture. The differences between the incoming and the reference pictures are evaluated in respect of their priorities for perception. The priority depends on the brightness-color difference and on the size of the particular picture block. The reference picture is advantageously coded in such a way that each point on the reference picture is represented as the difference between the picture value and a picture value in a superior hierarchical stage. The result is a ranked sequence of priorities which are listed in a list of priorities.

Compression Process

The incoming picture—which is to be compared with the reference picture—is preferably coded in a similar manner to the reference picture. This is done by recording the difference value from its anchor pixel in the superior structure for each pixel. The anchor address is achieved by zeroing bits of the pixel address. This has the advantage that the number of significant bits will be reduced for any point on the picture so that the amount of data to be transferred is decreased. In addition, it can be deleted through a simple zeroing of the structure. The picture differences discovered in analyzing the picture are now stored in order of priority together with their addresses in a memory (ADR/VAL). The sequence of picture differences is also stored. In respect of the picture difference bits to be transferred and their addresses, the memory content ADR/VAL is evaluated to assemble the bits to be transferred. The same information is also used for refreshing the reference picture. The picture difference bits transferred are cancelled from the memory. The priority of the picture element for further processing is thus reduced. If the difference between the incoming picture and the reference picture is equal to zero, the element, including the address and the position of the picture sequence, can be deleted. If there is no difference value available, the priority value of which is higher than the maximum of the priorities in the memory, the picture elements associated with the stored values can be refined. The refining can be carried out in respect of a sub-structure—smaller block size—as well as the presence of neighboring blocks. If they are present, they will be read into the memory and deleted from the priority list.

Decompression Process

In decompression, the memory for addresses and values or sequence of values is reconstructed or extended. The difference values so obtained will be added to the reference picture. The reference picture will be subject to reprocessing, e.g. the edges of non-subdivided blocks will be smoothed.

Explanation of FIG. 2

Encoder—analyses deviation between the current picture and the picture in the DS memory. Graphical objects are arranged in accordance with priorities. The address sequence within the object is determined. Picture elements stored with address and residual bits.

Decoder—analyses data stream for the DSS attribute. Reconstructs address sequence and address memory (only for receiver).

DS Memory—picture memory with hierarchical block structure. Permits dynamic matching of resolution and bit depth, as well as prioritizing picture elements.

Integrator—produces representable field from the DSS values.

Prior—priority memory for graphical objects.

Sequence—memory for address sequence within the object.

ADR-VAL—picture element addresses and residual bits.

Re-pr—reprocessing, e.g. area interpolation.

Figure 3:
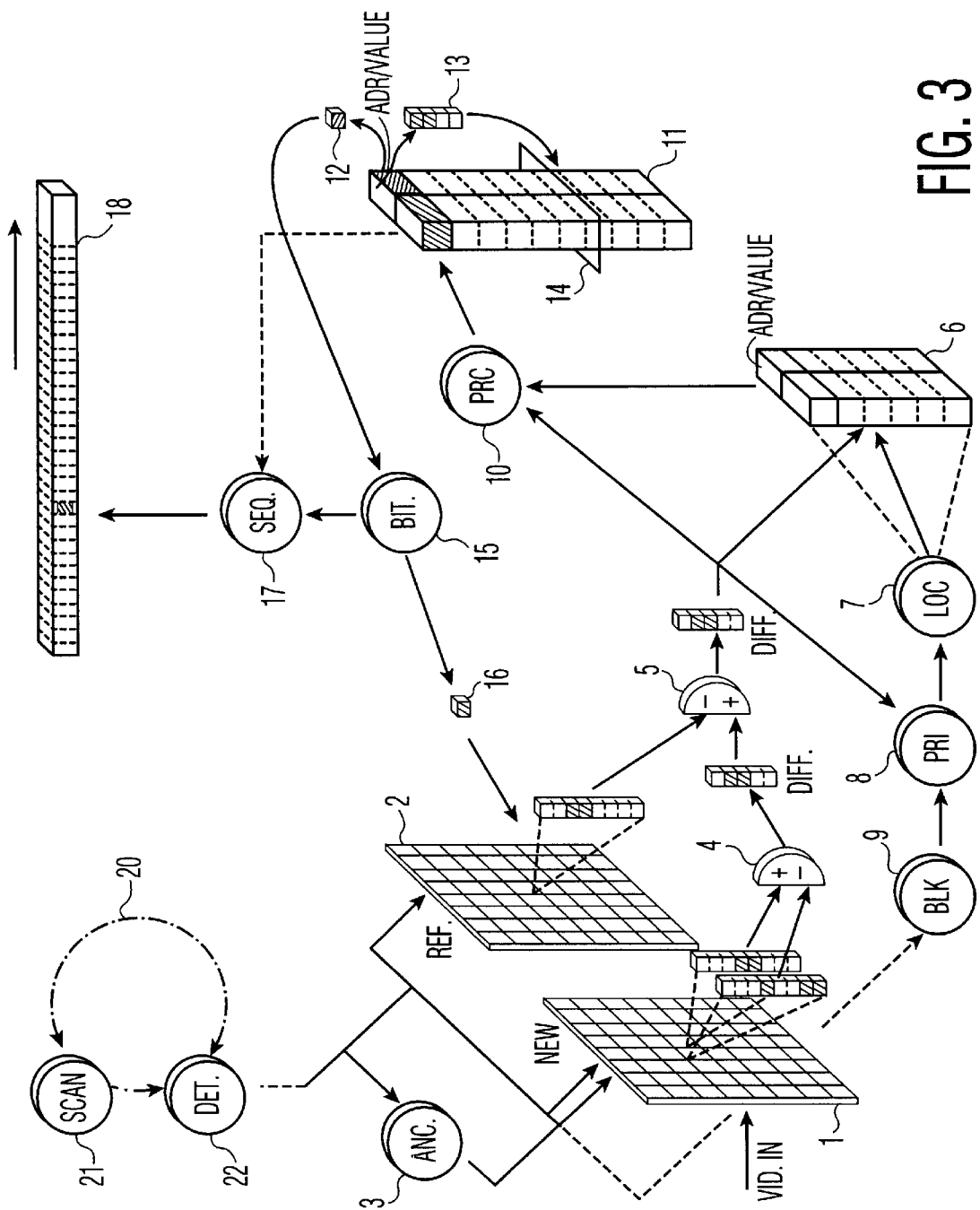
FIG. 3 describes the perception-optimized compression of the invention by means of an outline drawing.

FIG. 3 shows the compression on the basis of representation of a principle.

The compression can be broken down into the following individual steps:

1. A new video picture 1 comes from a video camera; the video picture is stored in memory 1.
2. The reference picture is placed in memory 2.
3. The anchor address is produced from the pixel address by setting bits to zero.
4. The formation of the picture difference in time and place variation; place variations are produced by subtracting the pixel from the anchor pixel.
5. Time variations are obtained by comparison of new picture 1 with reference picture 2, based on the place variation.
6. Preference memory 6 stores picture differences with the addresses.
7. Locator 7 allocates the place for the corresponding picture difference in preference memory 6; for this, the locator requires information from the priority generator 8.
8. The priority generator 8 places the individual priorities; it obtains information from the block analysis 9 and from the priority controller 10.
9. The priority controller 10 puts maximum priority in the priority memory 6.
10. The value and addresses in accordance with priorities are placed in the object memory 11. The transfer bit 12 is in the first position in the priority in the object memory 11.
11. The transfer bit 12 transfers the most important bit which is in the first position.
12. The residual bytes from the object memory 11 are stored at lower priority.
13. If the priority limit 14 is reached, the priority controller 10 is activated, together with the sequence control 17 of the bit processor 15.
14. The bit processor 15 improves the reference picture 2 and places bits ready for transmission.
15. The sequence control 17, where necessary, inserts address information into the data stream.
16. The transfer buffer 18 for transfer or storage of the string for the first picture.
17. The picture processing cycle 20—for processing an individual picture.
18. Continuing picture addressing to build up the priorities memory.
19. Selective addressing for detail analysis.

The present invention has so far been presented only in terms of the transfer of picture data. It is, however, possible to apply the perception-optimized transfer of video data in analogous manner to the transfer of audio data. Here, the amplitude and the magnitude of the change in the frequency spectrum of the audio signal are defined as the perception-relevant data. Otherwise, the method employed for video data can be employed in a similar way for the transmission of audio data.

In respect of the hardware provided by the present invention, the following can be stated:

Processor

The coding and decoding require a high computer capacity which can nevertheless be further reduced by selective choice of picture data.

A programmed processor with the 80486 processor would be adequate for carrying out the present invention.

Memory

In order to store a 640×400 byte picture, a buffer of 256 kbytes is required. A table for color coordination-conversion uses about 64 kbyte. The program and the smaller data buffer require an additional memory of about 64 kbytes, that is to say, the program can run on a simple DOS machine.

Picture Digitizer

The picture digitizer should be capable of sending the necessary part of a picture to system storage within the requisite time. An interface which allows transfer of 8 MB from a memory board allows 40 kbytes of data to be sent in 5 milliseconds.

Video Monitor

A screen with a video bus would have no problem in transmitting the picture in real time. The screen should, however, be capable of producing TV picture quality.

Audio and other data can be processed in real time using suitable adaptor cards.

Serial Adaptor Modem

Although the video coding technique described is directed at ISDN data rates, transfer with lower picture quality over a serial interface with a modem is possible.

I claim:

1. A process for perception-optimized video data transmission, comprising the steps of:

obtaining digitized picture data of a reference picture of a picture sequence at both a transmitter and a receiver;

obtaining digitized picture data of a subsequent picture of the picture sequence at the transmitter;

comparing the digitized picture data of the subsequent picture with the digitized picture data of the reference picture to produce picture difference elements, each picture difference element having a picture difference value and representing a region of varying structural size in the subsequent picture;

arranging the picture difference elements in a priority list in accordance with perception-relevance thereof, the perception-relevance of each picture difference element being determined essentially by the structural size of the region that it represents in the subsequent picture and the number of non-zero bits in its picture difference value;

transmitting the picture difference elements in order of their priority to the receiver; and updating the reference picture at the receiver and the transmitter using the picture difference elements.

2. A method in accordance with claim 1 wherein the reference picture and the subsequent picture are stored as structured difference pictures in which each picture value of a pixel is subtracted from the picture value of an anchor pixel in a superordinated structure, where the anchor address is produced by zeroing bits in the pixel address.

3. A process in accordance with claim 1, wherein the brightness and color information of a picture are processed separately.

4. A process in accordance with claim 1, wherein each picture difference element is allocated a picture difference value and a priority value.

5. A process in accordance with claim 1, wherein neighboring picture difference elements are summarized to a larger picture difference element and where the priority of the larger picture difference element is raised by one priority over the lowest priority of the picture difference elements contained therein.

6. A process in accordance with claim 1, wherein a list with priorities is produced at the transmitter and at receiver and in which, in the event that the priority list is full, for every new priority to be accommodated, the lowest priority from the priority list is discarded or in which, in the event that a picture difference element has already had a priority allocated, either the picture difference value is matched or a new priority is allocated to the picture difference element within the priority list.

7. A process in accordance with claim 1, wherein the picture difference values of the picture difference elements are coded in run-length code.

8. A device for perception-optimized transmission of video data for carrying out a process in accordance with claim 1, comprising:

an analog/digital converter;

memory for the storage of reference pictures, subsequent pictures, picture difference elements with addresses and a priority list;

a microprocessor for controlling, reading and encoding the video data; and a coder and decoder.

9. A data medium storing a computer program for carrying out a process in accordance with claim 1.

* * * * *